UNITED STATES PATENT OFFICE 2,077,108

PROCESS OF PREPARING DYESTUFFS OF THE ANTHRACENE SERIES

Josef Haller, Leverkusen-Wiesdorf, and Georg Rösch, Cologne-Mulheim, Germany, assignors, by mesne assignments, to Durand & Huguenin A.-G., Basel, Switzerland, a corporation of Switzerland No Drawing. Application March 23, 1933, Serial No. 662,386. In Germany March 26, 1932

6 Claims. (Cl. 260—31)

The present invention relates to a process of preparing dyestuffs of the anthracene series.

It is known to prepare dyestuffs of the anthracene series by reacting with oxidizing agents upon 9.10-disulfuric acid esters of leuco-beta-aminoanthraquinones in an alkaline medium (see, for example, British Patent No. 272,924).

It is the object of the present invention to provide improvements in this process, which avoid by-reactions to a far-reaching extent, and by which the reaction products are obtained in an especially good yield and in an excellent purity.

The process of manufacture of the present invention is by reacting upon the leuco-9.10-disulfuric acid ester of beta-aminoanthraquinone or substitution products thereof containing a free alpha-position to the amino group, with lead dioxide in an alkaline medium. The reaction may be performed at any desired temperature. It is accelerated by the application of heat, the best results generally being obtained at a temperature between about 50 and about 100° C. Higher temperatures are likewise operable but unnecessary.

The amount of the lead dioxide to be applied may vary within the widest limits. Advantageously at least one molecular proportion of the same should be applied on one molecular proportion of the starting material. Substantially larger amounts are operable but unnecessary. If smaller amounts are applied, part of the starting material will remain unchanged.

As outlined above the reaction is performed in an alkaline medium and care should be taken that the reaction mixture does not become acid during the reaction. As alkaline substances inorganic bases are equally as operable as are the organic bases. Examples of bases which can be used are alkali metal or alkaline earth metal hydroxides (KOH, NaOH, Ca(OH)$_2$ etc.), sodium or potassium carbonates, ammonia, alkali metal—or ammonium formiates,—acetates,—propionates,—oxalates, trisodium phosphate, dimethylamine etc. Generally, an aqueous alkaline medium will be applied, however, other alkaline media, such as alcoholic alkaline media etc. are operable quite generally. In some cases it may be of advantage to apply aqueous alkaline media containing an organic solvent miscible with water.

As further outlined above the leuco sulfuric esters of beta-aminoanthraquinone or salts or substitution products thereof may be applied as starting materials quite generally, provided that they contain a free alpha position to the amino group. Any desired monovalent substituents come into consideration, such as halogen atoms (chlorine or bromine, for example) alkyl groups (methyl-, ethyl-, propyl groups etc.), alkoxy groups, carboxylic acid or sulfonic acid groups, the groupings —CO.C$_6$H$_5$, —CO—C$_6$H$_4$Cl, —CO.C$_6$H$_4$O.CH$_3$,

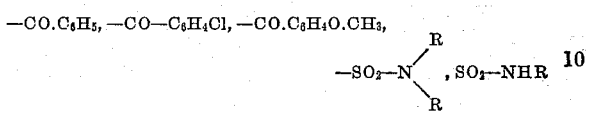

(R=alkyl or aryl) etc. Also compounds containing ring systems condensed with the anthraquinone nucleus (1.2-benz-3-aminoanthraquinone, for example) are operable and, therefore, they are intended to be included in the term "substitution products".

According to a further feature of our invention it is not necessary to start with the leuco sulfuric acid esters of beta-aminoanthraquinones or their salts themselves, but there may likewise be applied the corresponding compounds in which the amino group is acylated, for example, by formic acid, acetic acid, propionic acid, benzoic acid, chlorobenzoic acid, naphthoic acids etc. Likewise, the amino group may be present in form of an urethane or an urea and compounds of this type are intended to be embraced by the term "acylated". The conditions of reaction are the same as when working with the non acylated compounds, it is, however, a preferred method of working in this case to apply alkali metal or alkaline earth metal hydroxides as the alkaline agents or to work at a temperature high enough to bring about saponification of the acylamino group. The possibility of starting with the acylated compounds has the advantage that, when preparing the leuco sulfuric acid esters of beta-aminoanthraquinone or its substitution products, the amino group of the aminoanthraquinones is generally acylated before the esterification process in order to protect it against the influence of the esterifying agent. Therefore, there are obtained the acylated leuco sulfuric acid esters of β-aminoanthraquinones, and it is obvious that the possibility to use these compounds directly as the starting materials and to combine the saponification of the acylamino group with the oxidizing reaction is of great advantage. Obviously it is also possible to first prepare the leuco sulfuric acid esters of the beta-acylaminoanthraquinones, to saponify the same without isolation, then to add lead dioxide and to perform the oxidation reaction as disclosed above.

The following examples illustrate the invention, without, however, restricting it thereto, the parts being by weight:—

*Example 1*

To an aqueous suspension of 50 parts of the dipotassium salt of beta-amino-leuco-anthraquinone-9.10-disulfuric acid ester 220 parts of a 37% paste of lead peroxide are introduced under stirring and at room temperature after the addition of 15 parts of sodium carbonate. The stirring is continued until unchanged starting material cannot be detected anymore. After filtering, a strongly fluorescent solution is obtained. The products can be isolated in the usual manner and is most likely the tetra-leuco-sulfuric acid ester of 1.2.2'.1'-anthraquinone azine.

*Example 2*

100 parts of the dipotassium salt of 3-chloro-2-acetylamino-leuco-anthraquinone-9.10-disulfuric acid ester are suspended in about 1000 parts of water and 25 parts of potassium hydroxide are added. Thereupon 250 parts of an aqueous lead peroxide paste (48%) is added at a temperature of about 80–90° C. and the mass stirred at this temperature for two to three hours. After cooling and filtering an orange red crystalline precipitate is separated out of the fluorescent deeply yellow colored solution by the addition of potassium carbonate. By redissolving this potassium salt in a hot potash solution, orange brown colored prisms are obtained, which after drying, turn to a difficultly soluble blue compound with partial saponification of the leuco-sulfuric acid ester. When adding to the originally obtained yellow solution some dilute hydrochloric acid, a dull blue colored precipitate is formed, which changes to a bright blue coloration (dichloroindanthrene) on the addition of an oxidizing agent, for example sodium nitrite.

*Example 3*

40 parts of the tripotassium salt of the leucosulfuric acid ester obtainable from 2-acetylaminoanthraquinone-3-carboxylic acid are dissolved in 800 parts of water with the addition of 13 parts of caustic soda solution. At a temperature of about 90° C. 200 parts of a lead peroxide paste (49%) are added and stirring is continued, until the dyestuff obtainable from a filtrated test portion by acid oxidation no longer increases. Thereupon the reaction mixture is filtered and from the yellow colored filtrate a compound in form of orange colored prisms is isolated by salting out. It is easily soluble in water with an intense yellow coloration and green fluorescence. Acetic acid induces a change of the yellow coloration to a bright blue red. Mineral acids temporarily induce a red color, thereupon they separate a difficultly soluble blue compound, which can be converted by acid oxidizing agents into a bright greenish blue (most likely the dicarboxylic acid of indanthrene).

Instead of the acetyl compounds mentioned in the foregoing examples other acyl compounds, such as the propionyl compounds or urethanes may be applied.

*Example 4*

To a solution of 45.8 parts of the sodium salt of 2-amino-3-methoxyanthrahydroquinone-9.10-disulfuric acid ester and 140 parts of caustic soda solution (32° Bé.) in 500 parts of water, 250 parts of a lead peroxide paste (49%) is added and the mixture is stirred for 2 hours at a temperature of about 80–85° C. Thereupon it is sucked off and from the reddish orange colored filtrate an orange red substance is obtained by means of salting out or evaporation. By redissolving in water and salting out beautiful, orange colored needles are obtained, which dissolve in water with a golden yellow color and a weak fluorescence. On acidifying the solution with mineral acid the color changes first to green then to blue and shortly afterwards a bluish violet compound is separated, which dissolves in water at the addition of caustic soda solution with a bluish red coloration. By the action of acid oxidizing agents, for example, sodium nitrite and hydrochloric acid, or by the treatment of the reaction product with dilute mineral acid in the presence of oxidizing acting salts, such as copper sulfate, a greenish blue vat dyestuff is obtained from the yellow as well as from the bluish violet compound, which dyestuff is most likely the 3.3'-dimethoxy-N-dihydro-1.2.2'.1'-anthraquinone azines.

We claim:—

1. The process which comprises reacting upon a compound selected from the group consisting of a leuco sulfuric acid ester of beta-aminoanthraquinone and a leuco sulfuric acid ester of beta-aminoanthraquinone acylated in the amino-group, which compounds have a free position alpha to the amino group, with lead dioxide in an alkaline medium, care being taken that the reaction mixture does not become acid during the reaction.

2. The process which comprises reacting upon a compound selected from the group consisting of a leuco sulfuric acid ester of beta-aminoanthraquinone and a leuco sulfuric acid ester of beta-aminoanthraquinone acylated in the amino group, which compounds have a free position alpha to the amino group, with lead dioxide in an aqueous alkaline medium, care being taken that the reaction mixture does not become acid during the reaction.

3. The process which comprises reacting at a temperature between about 50 and about 100° C. upon a leuco sulfuric acid ester of beta-aminoanthraquinone and a leuco sulfuric acid ester of beta-aminoanthraquinone acylated in the amino group, which compounds have a free position alpha to the amino group, with lead dioxide in an alkaline medium, care being taken that the reaction mixture does not become acid during the reaction.

4. The process which comprises reacting at a temperature between about 50 and about 100° C. upon a leuco sulfuric acid ester of beta-aminoanthraquinone and a leuco sulfuric acid ester of beta-aminoanthraquinone acylated in the amino group, which compounds have a free position alpha to the amino group, with lead dioxide in an aqueous alkaline medium, care being taken that the reaction mixture does not become acid during the reaction.

5. The process which comprises causing lead dioxide to react upon a member of the group consisting of 2-amino-leuco-anthraquinone-9.10-disulfuric acid ester and 2-amino-leuco-anthraquinone-9.10-disulfuric acid ester acylated in the 2-amino group, in an aqueous alkaline medium containing an alkali metal hydroxide as the alkaline agent at a temperature between about 50° C. and about 100° C., the lead dioxide being applied in an amount corresponding to at least one molecular proportion on one molecular proportion of the starting material.

6. The process which comprises causing lead dioxide to react upon a member of the group consisting of 3-chloro-2-amino-leuco-anthraquinone-9.10-disulfuric acid and 3-chloro-2-amino-leuco-anthraquinone-9.10-disulfuric acid acylated in the 2-amino group in an aqueous alkaline medium containing an alkali metal hydroxide as the alkaline agent at a temperature between about 50° C. and about 100° C., the lead dioxide being applied in an amount corresponding to at least one molecular proportion on one molecular proportion of the starting material.

JOSEF HALLER.
GEORG RÖSCH.